March 17, 1970 C. E. ATKINS ET AL Re. 26,828
LIQUID LEVEL DETECTOR
Original Filed Aug. 31, 1964
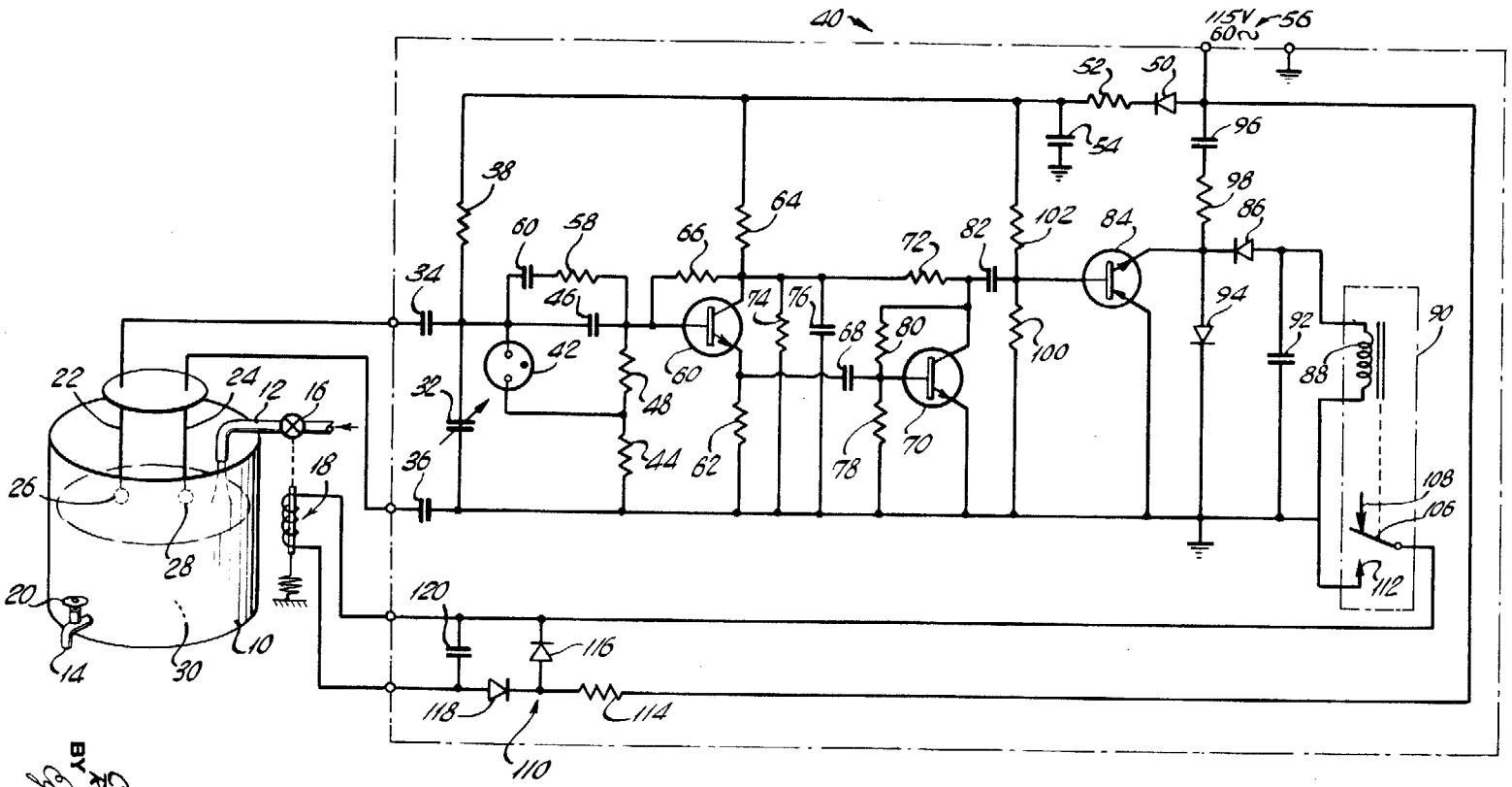
INVENTORS
CARL E. ATKINS
ROBERT L. ZIOLKOWSKI
BY Eyre, Mann & Lucas
ATTORNEYS United States Patent Office Re. 26,828
Reissued Mar. 17, 1970

26,828

LIQUID LEVEL DETECTOR

Carl E. Atkins, Montclair, N.J., and Robert L. Ziolkowski, Roselle, Ill., assignors, by mesne assignments, to Wagner Electric Corporation, South Bend, Ind., a corporation of Delaware Original No. 3,291,149, dated Dec. 13, 1966, Ser. No. 393,175, Aug. 31, 1964. Application for reissue Mar. 22, 1968, Ser. No. 717,056
Int. Cl. G01f *23/26;* F16k *21/18;* G05d *9/12*
U.S. Cl. 137—392 9 Claims

Matter enclosed in heavy brackets [ ] appears in the original patent but forms no part of this reissue specification; matter printed in italics indicates the additions made by reissue.

*ABSTRACT OF THE DISCLOSURE*

*An electronic apparatus for detecting the level of a liquid is provided wherein spaced conductive elements are positioned at predetermined locations to detect the level of the liquid. When the liquid level rises sufficiently to touch the elements or change the dielectric constant in the space between the elements to change the capacitance between the elements, a signal is fed into an oscillator circuit which in response thereto sends an output signal to an amplifier. The amplified signal, in turn, is used to provide an indication of the detection of the liquid or a feedback control over the flow of the liquid.*

The present invention relates to liquid level detectors and provides a liquid level detector which can be employed to control or indicate the level of liquids.

In accordance with our present invention two spaced conductive elements are positioned so that they both contact a liquid at its desired level. These elements are connected across a capacitor in a series circuit which includes in its path the liquid whose level is being detected. The capacitor is provided with charging and discharging paths with a nonlinear breakdown device in one of the two paths so that a pulsating voltage is produced across the capacitor by the alternate charging and discharging of the capacitor caused by the alternate conductnce and nonconductance of the nonlinear breakdown device.

With this arrangement a change in the level of the liquid will cause a change in the impedance of the series circuit. Since this series circuit is in shunt with the capacitor, this change will bring about a change in the charging and discharging currents through the charging and discharging paths respectively. Thus, the magnitudes of the charging and discharging current give an indication of the liquid level and can be employed to indicate that level to an observer or, as in the illustrated embodiment, to control that level.

For a better understanding of the present invention reference should be had to the accompanying drawing which is an electro-mechanical schematic of one embodiment of the present invention.

In the illustrated embodiment, a container 10 for holding liquid is provided with a spigot 12 for filling the container and a tap 14 for emptying the container. The spigot 12 is provided with a valve 16 which can be opened and closed automatically by actuating and deactuating a solenoid 18 and the tap is provided with a valve 20 which can be controlled manually.

Extending into the container are two electrodes 22 and 24 whose tips, here illustrated by the enlarged portions 26 and 28, are positioned at the level at which the liquid 30 in the container is desired to be kept. Electrodes 22 and 24 are kept spaced from each other and are connected to opposite sides of a variable capacitor 32 through capacitors 34 and 36, respectively. The electrodes 22 and 24 and the capacitors 34 and 36 thus form a series circuit which is open at the tips 26 and 28 of the electrodes.

When the liquid 30 contacts both tips this series circuit is completed. If the liquid is a dielectric, there is a capacitive connection between the tips 26 and 28, and if the liquid 30 is a conductor, there is a resistive connection between the two tips 26 and 28. In any case when liquid contacts both the electrodes the impedance across capacitor 32 is changed.

Capacitor 32 is provided with a charging path consisting of resistor 38 which is connected in series with the capacitor 32 across a D.C. source 40. A discharging path for capacitor 32 consists of a neon glow tube 42 and a resistor 44. Connected in shunt across the neon glow tube 42 is a differential circuit consisting of a capacitor 46 and a resistor 48 in series.

The D.C. power supply 40 consists of a diode 50, a resistor 52 and a capacitor 54 connected in series across the terminals of the usual 115 volt, 60 cycle source 56. The output of this power supply is connected to the charging resistor 38 coupling the D.C. potential output of the power supply across the variable capacitor 32 so that current flows through resistor 38 from the D.C. power supply charging capacitors 32 and 46 with respect to ground. When either capacitor 32 or 46 exceeds the breakdown potential of the neon tube 42 the neon tube 42 conducts and both capacitors 32 and 46 discharge through it. Discharge current for capacitor 32 travels from one side of the capacitor through the neon tube 42 and resistor 44 to the other side of the capacitor while the discharge current for capacitor 46 travels from the one side of the capacitor 46 through the neon tube 42 and resistor 48. As the voltage on the capacitors 32 and 46 drop due to their discharging through the neon tube 42, the current through the neon tube 42 decreases and will eventually fall below the level necessary for maintaining conduction in the neon tube 42. When this occurs the neon tube 42 will extinguish, cutting off the discharge paths for the capacitors 32 and 46. With the discharge paths for the capacitors cut off the capacitors 32 and 46 again start to be charged by the current flow through resistor 38 and thus the charging and discharging cycle repeats itself. This alternate charging and discharging of the capacitors 32 and 46 produces a series of pulses across each of resistors 44 and 48 which are summed to produce a differential output across both resistors since the discharge current through these resistors is in opposite directions.

In this embodiment the value of capacitance of the capacitors 32 and 46 are equal as are the values of the resistors 44 and 48. Thus, the differential output across the resistors 44 and 48 is theoretically the lowest voltage possible across the two resistors.

When the liquid 30 simultaneously contacts the tips 26 and 28 of the electrodes 22 and 24 the series circuit is completed as described above. The impedance of the series circuit is thereby added in shunt with capacitor 32. In the present case, this increases the current flow through resistor 44 during discharging of the capacitors 32 and 46 since the charge on capacitors 34 and 36 must now be dissipated through resistors 44 along with the charge on capacitor 32. This will change the differential voltage across resistors 44 and 48 from the mentioned null value, making the total voltage across the resistors more positive.

As pointed out above, the capacitance of capacitors 32 and 46 are equal and the resistance of resistors 44 and 48 are equal. In the circuit disclosed in copending application, Ser. No. 277,888, filed May 3, 1963, now abandoned, a similar oscillator was employed in which the values of the capacitors and the resistors were not selected to be equal but were selected to give an imbalance voltage across the resistors rather than obtaining a null voltage across resistors. For this reason, this previous circuit was much more sensitive to changes in the characteristics of the neon tube 42 and to slight variations in the magnitude of the voltage supplied by the power supply 40. The present oscillator circuit shows no such sensitivity to either changes in the characteristics of the neon tube 42 or the voltage supplied to charge the capacitors 32 and 46 and has in addition been found to be extremely reliable.

With the oscillator circuit as so far described it would be assumed that the resultant voltage of the differential output across resistors 44 and 48 is quite small because capacitor 32 equals capacitor 46 and resistor 44 equals resistor 46. However, because in certain cases the size of the change in magnitude of the differential output across resistors 44 and 48 caused by the change in impedance is itself quite small, this resultant voltage is sufficient to interfere with the detection of the change in the differential output. Though it is not sure what causes this relatively large resultant voltage, it is assumed that it is due to the fact that resistors 44 and 48 are in the charging path of capacitor 46 while there is no comparative resistance in the charging path of capacitor 32. However, no matter what the cause, it has been found that employing a resistor 58 and a blocking capacitor 60 in shunt with capacitor 46 materially reduces the resulting voltage so it is no longer a factor in detection of the changes in the magnitude of the differential output across resistors 44 and 48.

The differential output across resistors 44 and 48 is fed into the input of an amplifier which has two stages. The first stage of the amplifier comprises a first transistor 60 with its base to emitter path connected across resistors 44 and 48 in series with a resistor 62, with a resistor 64 coupling its collector to the output of the D.C. power supply 40, and with a resistor 66 connecting its base to its collector, for bias and stability purposes.

The current amplified output from the first stage of the amplifier is fed into the second stage of the amplifier through a capacitor 68, coupling the emitter of the first transistor 60 to the base of a second transistor 70. The emitter of the second transistor 70 is connected to ground while the collector of the second transistor 70 is connected to the collector of the first transistor 60 through resistor 72. A resistor 74 and capacitor 76 are connected in shunt between the collector of the first transistor and ground for biasing and filtering purposes respectively, and a resistor 78 is connected between the base and the emitter of the second transistor 70 to bias the base with respect to the emitter. Like the first transistor 60, the second transistor 70 has a resistor 80 connecting its base to its collector for bias and stability purposes.

The output of the second stage of the amplifier or the collector of the second transistor 70 is connected by a capacitor 82 to the base of a germanium four layer PNPN semiconductor switching device 84, such as 2N1966. Connected in series between the emitter and collector of this semiconductor switching device 84 is a diode 86 and the coil 88 of a relay 90. In shunt with the coil 88 is a capacitor 92 and in shunt across the emitter and collector is a diode 94.

The emitter to collector path of the semiconductor switching device 84 is connected in series with a capacitor 96 and a resistor 98 across the source of excitation 56 so as to couple the A.C. source to the semiconductor switching device. However, only negative current can flow through the semiconductor switching device 84 from the A.C. source 56 because positive current is shunted past the semiconductor switching device by the diode 94. Whether negative current A.C. will flow through the semiconductor switching device 84 will depend on the polarity of voltage on the base of the semiconductor switching device which in turn depends on the combined output of a bias circuit and the amplifier.

The bias circuit consists of a resistor 100 connected between the base and emitter of the semiconductor switching device and a resistor 102 connected between the base of the semiconductor device 85 and the output of the power supply 40. This bias circuit supplies a positive potential to the base. When the level of the liquid is such that both tips 26 and 28 are not contacted the pulses reaching the base of the semiconductor switching device through the amplifier are not sufficient to drive the base negative while the collector is negative. Therefore, the semiconductor switching device 84 remains non-conductive during the negative half cycles of excitation applied thereacross. This means that current will flow through the capacitor 96, the resistor 98 and through the diode 86 and the coil 88 during the negative half cycles. This current flow through the coil 86 is sufficient to energize the relay 90. Though positive current is shunted to ground by the diode 94, diode 86 isolates the coil 88 from the path to ground through the diode 94 during this time to prevent deenergization of the relay 90, so that the relay is energized all the time the semiconductor switching device 84 is nonconductive.

With the relay 90 energized the armature 106 of the relay is in contact with an unconnected contact 108 of the relay. The armature 106 of the relay is connected to one side of the coil of the solenoid 18 while the other side of the solenoid coil is connected through a rectifying circuit 110 to the ungrounded terminal of the source 56. Therefore, while the relay 90 is energized the energizing circuit of solenoid 18 is open at armature 106. With the solenoid deenergized, the solenoid controlled valve 16 is open allowing liquid to enter the container 10 through the spigot 12. Eventually the liquid entering through the spigot raises the level of the liquid 30 in the container sufficiently to contact the tips 26 and 28. When this occurs whether the liquid be a conductor or a dielectric additional impedance is added in shunt with the capacitor 32 as discussed above. This provides positive pulses which are greater in magnitude than the mentioned null or resultant potential. These pulses of increased potential are amplified by the amplifier and fed to the base of the semiconductor switching device 84 as negative pulses which drive the base of the semiconductor switching device 84 negative causing the device to conduct. When the semiconductor switching device 84 conducts all excitation from the 115 volt, 60 cycle source 56 is shunted past the coil 88 of the relay 90, thus deenergizing the relay 90.

With the relay 90 deenergized, the armature 106 of the relay moves away from the contact 108 and contacts contact 112 which is connected to ground. This connects the coil of the solenoid 18 to the source 56 through the rectifying circuit 110 which consists of a resistor 114 and diode 116 connected in shunt across the source 56 and a diode 118 and capacitor 120 connected in shunt with the diode 116. The resistor 114 and the diode 116 prevent positive potential from reaching the coil of the solenoid 18 while permitting the negative potential to do so and energize the solenoid 18. The diode 118 and capacitor 120 prevent the coil being deenergized during the positive portion of the excitation while diode 116 is conducting.

Thus, while the relay 90 is deenergized, the solenoid 18 is energized. Energization of the solenoid 18 closes the valve 16 stopping the flow of liquid through the spigot 12 and thereby preventing the level of the liquid from going above the tips 26 and 28.

The relay will remain deenergized as long as the liquid in the container is in contact with both of the tips 26 and 28 since this will maintain the added impedance in shunt with the capacitor 32 and thus provide the negative pulses at the base of the semi-conductor switching device 84. However, if the level of the water should fall below the tips 26 and 28 then the added impedance would no longer be in shunt with the capacitor 32 and the oscillator would return to its initial state; that is, with its output at a null potential. This would mean that the oscillator would supply no more negative pulses to the base of the semiconductor switching device 84 and thereby allow the device 84 to be rendered non-conductive permitting negative excitation from the source to energize the relay 90. Energization of the relay 90 results in deenergization of the solenoid 18 because the armature moves away from contact 112 and opens the circuit between the source 56 and the coil of the solenoid 18. Lowering of the level of liquid 30 could be accomplished by opening the spigot 14 for instance.

Above one embodiment of the present invention has been disclosed. It should be apparent to those skilled in the art that a number of variations of this embodiment may be devised without departing from the spirit and scope of the present invention. For instance, instead of probes as shown the conductive elements 22 and 24 could be spaced vertical plates and could be used with the disclosed oscillator to measure the level of a dielectric liquid between them since the output of the oscillator will vary as the capacitance between the plate changes with the level of the liquid.

*It should be noted, also, that where the liquid is a dielectric and therefore a non-conductor, physical contact of the dielectric liquid with the spaced conductive elements 22 and 24 is superfluous, since current will not flow through the liquid regardless of whether or not the liquid touches the conductive elements and, moreover, the capacitive connection formed between the conductive elements by the liquid does not depend upon or require current flow through the liquid. This capacitive connection comprises a change in capacitance between the conductive elements that is caused when there is a change in the dielectric constant in the space between the conductive elements as for example when liquid displaces the air in that space. Such change in capacitance causes the above-mentioned change in impedance in the series circuit formed by electrodes 22 and 24 and capacitors 34 and 36, connected in shunt to capacitor 32.*

In addition, instead of using two probes only one probe is actually needed if the liquid is a conductor since the spigot 12 may be used as one of the probes, if it is conductive and the lead from one of the capacitors 34 and 36 is connected to it.

Therefore, it should be obvious that a number of changes can be made in the disclosed embodiment and for this reason it should be understood that the scope of the present invention is not limited by what has been stated hereinbefore but should be determined from the spirit and scope of the appended claims.

We claim:

1. A liquid level detector comprising:

(a) two capacitive means connected end to end;

(b) two resistance means connected end to end and in series with said two capacitive means;

(c) charging circuit means for charging said two capacitive means;

(d) nonlinear breakdown means coupled across said two capacitive means for discharging said two capacitive means through said two resistance means when the voltage on said capacitive means exceeds a certain level so as to provide a pulsating differential output across said two resistance means;

(e) spaced electrically conductive members for contacting liquid to detect the level thereof; and (f) means electrically coupling said spaced electrically conductive members across one of said two capacitive means for changing the impedance of said one of said two capacitive means when both the spaced electrically conductive means are in contact with a liquid body.

2. The liquid level detector of claim 1 wherein said two capacitive means have substantially the same value and the two resistive means have substantially the same value.

3. The liquid level detector of claim 1 wherein said nonlinear breakdown means is coupled between a point common to both capacitive means and a point common to both resistive means.

4. The liquid level detector of claim 1 wherein said charging circuit is coupled across said one of said capacitive means.

5. The liquid level detector of claim 1 wherein one of said spaced electrically conductive members is capacitively coupled to one end of said one of said capacitive means and the other of said spaced electrically conductive members is capacitively coupled to the other end of said one of said capacitive means.

6. A liquid level control comprising:

(a) two capacitive means connected end to end;

(b) two resistance means connected end to end and in series with said two capacitive means;

(c) charging circuit means for charging said two capacitive means;

(d) nonlinear breakdown means coupled across said two capacitive means for discharging said two capacitive means through said two resistance means when the voltage on said capacitive means exceeds a certain level so as to provide a pulsating differential output across said two resistance means;

(e) spaced electrically conductive members for contacting the liquid to detect the level thereof;

(f) means electrically coupling said spaced electrically conductive members across one of said two capacitive means for changing the impedance of said one of said two capacitive means when both the spaced electrically conductive means are in contact with the liquid; and (g) means for varying the level of the liquid which is responsive to the change in impedance of said one of said two capacitors.

7. A liquid level detector comprising:

(a) a capacitive means for storing electrical charge;

(b) circuit means for alternately charging and discharging said capacitive means in respective cycles, said circuit including:

(i) a resistive charging path with resistive means for coupling said capacitive means to a source of potential for charging said capacitive means;

(ii) a resistance discharging path with resistive means coupled in shunt with said capacitive means for discharging said capacitive means; and (iii) nonlinear breakdown means coupled in one of the paths in series with said resistive means in said one of the paths so that the current flow through the resistive means will change depending on the charge on the capacitive means to cause said capacitive means to alternately charge and discharge through said charging and discharging paths respectively;

(c) spaced electrically conductive means for contacting liquid to detect the level thereof; and (d) means electrically coupling said spaced electrically conductive members across said capacitive means for changing the impedance of said capacitive means when both the spaced electrically conductive means are in contact with the liquid.

*8. A liquid sensing device comprising:*

*(a) a capacitive means for storing electrical charge;*

*(b) circuit means for alternatively charging and discharging said capacitive means in respective cycles, said circuit including:*

*(i) a resistive charging path with resistive means for coupling said capacitive means to a source of potential for charging said capacitive means;*

*(ii) a resistance discharging path with resistive means coupled in shunt with said capacitive means for discharging said capacitive means; and*

*(iii) ion-linear breakdown means coupled in one of said paths in series with the resistive means thereof so that the current flow through*

*said resistive means will change depending on the charge on said capacitive means to cause said capacitive means to alternately charge and discharge through said charging and discharging paths respectively;*

(*c*) *spaced conductive elements for detecting a change in capacitance between said elements when a liquid changes the dielectric constant in the space between said elements; and*

(*d*) *means electrically coupling said spaced conductive elements across said capacitive means for changing the impedance of said capacitive means in response to said detected change in capacitance.*

*9. A liquid sensing device comprising:*

(*a*) *two capacitive means each having one side connected to a common junction;*

(*b*) *two resistive means connected together at one of their ends and connected at their other ends to the other sides of said two capacitive means;*

(*c*) *charging means connected to said common junction;*

(*d*) *a non-linear breakdown means connected between said common junction and said connection connecting together said resistive means for discharging said two capacitive means when the charge thereon is sufficient to cause the voltage across said non-linear breakdown means to exceed a level at which conduction therethrough takes place, thereby causing said two capacitive means to be alternately charged and discharged;*

(*e*) *spaced conductive elements for detecting a change in capacitance between said elements when a liquid changes the dielectric constant in the space between said elements; and*

(*f*) *means for changing the impedance of one of said two capacitive means in response to said detected change in capacitance.*

References Cited

The following references, cited by the Examiner, are of record in the patented file of this patent or the original patent.

UNITED STATES PATENTS

| | | | |
|---|---|---|---|
| 3,339,578 | 9/1967 | Smith | 137—392 |
| 3,340,892 | 9/1967 | Holland | 137—392 |
| 3,391,547 | 7/1968 | Kingston | 137—392 X |

WILLIAM F. O'DEA, Primary Examiner

DAVID R. MATTHEWS, Assistant Examiner

U.S. Cl. X.R.

73—304; 324—60